United States Patent [19]

Gentilman et al.

[11] Patent Number: 4,720,362

[45] Date of Patent: Jan. 19, 1988

[54] TRANSPARENT ALUMINUM OXYNITRIDE AND METHOD OF MANUFACTURE

[75] Inventors: Richard L. Gentilman, Acton; Edward A. Maguire, Ashland; Leonard E. Dolhert, Malden, all of Mass.

[73] Assignee: Raytheon Company, Lexington, Mass.

[21] Appl. No.: 714,223

[22] Filed: Mar. 20, 1985

Related U.S. Application Data

[62] Division of Ser. No. 570,419, Jan. 13, 1984, which is a division of Ser. No. 297,896, Aug. 31, 1981.

[51] Int. Cl.$^4$ .............................................. B29D 11/00
[52] U.S. Cl. ..................................... 264/1.2; 264/65; 264/125; 423/266; 423/275; 423/385; 423/625; 423/631; 501/98; 501/152; 501/153; 501/904
[58] Field of Search ............................ 264/1.2, 65, 125; 501/98, 153, 904, 152; 423/266, 275, 385, 625, 631

[56] References Cited

U.S. PATENT DOCUMENTS

| | | | |
|---|---|---|---|
| 4,184,884 | 1/1980 | Jong | 501/98 |
| 4,241,000 | 12/1980 | McCauley et al. | 423/266 |
| 4,481,300 | 11/1984 | Hartnett et al. | 501/904 |
| 4,520,116 | 5/1985 | Gentilman et al. | 501/98 |

*Primary Examiner*—Stephen J. Lechert, Jr.
*Attorney, Agent, or Firm*—Denis G. Maloney; Richard M. Sharkansky

[57] ABSTRACT

An article of manufacture is provided comprising a polycrystalline cubic aluminum oxynitride having a density of at least 98% of theoretical density, and being transparent to electromagnetic radiation in the wavelength range from 0.3 to 5 micrometers with an in-line transmission of at least 20% in this range.

A method of preparing the optically transparent aluminum oxynitride is also provided comprising the steps of forming a green body of substantially homogeneous aluminum oxynitride powder and pressureless sintering said green body in a nitrogen atmosphere and in the presence of predetermined additives which enhance the sintering process. Preferred additives are boron and yttrium in elemental or compound form.

20 Claims, No Drawings

TRANSPARENT ALUMINUM OXYNITRIDE AND METHOD OF MANUFACTURE

CROSS-REFERENCE TO RELATED APPLICATIONS

This is a division of application Ser. No. 570,419, filed Jan. 13, 1984, which is a continuation of application Ser. No. 297,896, filed Aug. 31, 1981.

BACKGROUND OF THE INVENTION

This invention relates to durable transparent ceramic compounds. There is a need for these compounds in applications requiring substantial transmission and imaging capabilities in the visible range and the infrared range. These requirements can be found in both military and commercial applications. For example, infrared transparent domes are needed for missiles and transparent envelopes are needed in different types of vapor lamps. Many transparent materials are not adequately durable for these applications, thus, the search has been directed towards developing transparent ceramics. Although many ceramic compounds satisfy the durability requirement, they are not transparent to a sufficient degree for these applications. For instance, alumina is a very hard material but the main problem is that it is not sufficiently transparent and scatters light to an excessive degree. An additional consideration for a candidate material is the cost of manufacturing, thus, methods that require individual processing of these windows are bound to remain an unfeasible alternative from a cost point of view. From this perspective, forging and hot-pressing methods are not desirable. This leaves batch processing methods as a desirable feasible alternative and sintering lends itself to the manufacture of a plurality of units in a single run. However, the sintering of transparent ceramics is not widely known or practiced.

Aluminum oxynitride is a promising candidate for applications requiring multi-spectral transmission capabilities. The only known prior attempt at producing a sintered aluminum oxynitride body is found in U.S. Pat. No. 4,241,000, wherein precursor powders are mixed and the sintering step is used to both react and sinter the precursor powders to produce an aluminum oxynitride body. The problem is that the resulting material is not sufficiently transparent for the applications mentioned hereinabove.

SUMMARY OF THE INVENTION

These and other problems are solved by the present invention which provides for the sintering of cubic aluminum oxynitride to produce a transparent ceramic window. It was found that starting with a homogenous powder of cubic aluminum oxynitride and using specific additives leads to an adequately transparent window in both the visible and infrared range. It was further found that the sintering parameters of the present invention are such that a liquid phase at grain boundaries occurs during the early stages of sintering.

This invention provides for a cubic aluminum oxynitride body having a density of at least 98% of theoretical density, an in-line transmission of at least 20% in the wavelength range of 0.3 to 5 microns, and a resolving angle of better than 3 mrad.

This invention further provides for a method of manufacturing a substantially transparent aluminum oxynitride body comprising the steps of forming a homogeneous single phase aluminum oxynitride powder, pressing said powder into a green body of predetermined shape, and sintering in a nitrogen atmosphere said green body in the presence of dopants. Preferably, said aluminum oxynitride powder has an average particle size less than 1.0 micrometers, said dopants comprise boron and yttrium or compounds thereof, and said sintering step is at a temperature higher than 1900° C., but lower than the solidus temperature of aluminum oxynitride and for a period of at least 20 hours.

DESCRIPTION OF THE PREFERRED EMBODIMENT

The method of the present invention uses a substantially homogenous aluminum oxynitride powder to produce a transparent sintered aluminum oxynitride body. The homogenous cubic aluminum oxynitride powder may be prepared by the following method. A mixture is prepared comprising of 30–37 mole % aluminum nitride and 70–63 mole % aluminum oxide (alumina). The aluminum oxide normally consists of the alpha type. Both components are fine particle powders having a particle size not greater than 74 micrometers. The aluminum nitride has a purity level of 97–98% while the aluminum oxide is 99.9% or greater. The mixture is ball-milled in alumina mills with alumina grinding media and with methanol as the milling medium. The preferred duration of milling is 16 hours. The mixture is then dried and placed in alumina crucibles for calcination. Calcining is done at a temperature range of 1600°–1750° C. for four hours with a stagnant atmosphere of nitrogen at a pressure range of 0–5 psig. During the calcination, alumina reacts with the aluminum nitride to form a cubic aluminum oxynitride compound. The calcined aluminum oxynitride powder is additionally ball-milled in alumina mills with alumina grinding media and methanol as the milling medium. The preferred duration of the milling is 72 hours. This results in a single phase aluminum oxynitride powder having an average particle size smaller than 1.0 micrometers. The slurry is then thoroughly dried. A small amount of doping additive, as discussed herein below, may be added at this point to the aluminum oxynitride or prior to the second milling step. Alternatively, the doping additive may be added later. The only requirement is that the total amount of the additive present in a body during the sintering step not exceed approximately 0.5% by weight of the green body. The aluminum oxynitride powder is placed in rubber molds having predetermined shapes and is isostatically pressed at pressures greater than 15,000 psi to produce green bodies to be used in sintering. The fabricated green bodies are set in containers in the sintering chamber. The containers are composed either entirely of boron nitride or partly of boron nitride and partly of molybdenum metal. The small quantity of the doping additive may alternatively be added now in the containers with the fabricated green bodies. The additive may be in the form of a mixture of aluminum oxide, aluminum nitride and the additive, with the additive comprising up to 100% by weight of the mixture. The preferred additive is yttrium oxide, but elemental yttrium or other compound forms may also be used. Sintering is then performed in a stagnant atmosphere of nitrogen at 0–5 psig. Sintering temperatures used were higher than 1900° C., but lower than the solidus temperature of aluminum oxynitride which is approximately 2140° C. Sintering may be performed for a minimum of 20 hours up to 100 hours. The resulting polycrystalline sintered body has an average grain size of 200 microns.

The unexpected transparency obtained by the method of the present invention was discovered after the sintering in a boron nitride container of a first undoped oxynitride green body together with a second oxynitride green body containing 5 weight percent yttrium oxide. Spectrographic analysis revealed that the first sample contained trace amounts of both boron and yttrium. For a sintering temperature of 1925° C. and a duration of 24 hours, the transparent oxynitride body has an additive doping of 100 parts per million (ppm) boron and 600 ppm yttrium. If yttrium oxide were to be used in the mixture as the source of yttrium, then the weight percent of $Y_2O_3$ needed would be 0.075% of the green body. The density of this aluminum oxynitride sintered sample is greater than 99% of theoretical density, the in-line transmission, for a sample thickness of 1.78 mm, at 4 microns is 43% and the resolving angle is 0.5 mrad. The in-line transmission is at least 40% in the range of 0.3 to 5 microns.

The density was measured by the Archimedes method, in-line transmission was measured with a 457 Perkin-Elmer Grating Infrared Spectrophotometer, and the resolving angle was measured by using the Standard USAF 1951 Resolution Test Pattern.

A similar sample was sintered at a temperature of 1940° C. keeping the other process parameters the same. The boron doping remained the same at 100 ppm while the yttrium doping increased slightly to 800 ppm resulting in a $Y_2O_3$ requirement of 0.10 weight percent for an equivalent doping. The density remained the same at over 99% of theoretical density, the in-line transmission, for a thickness of 1.78 mm, was 41% at 4 microns, and the resolution remained at 0.5 mrad.

Another sample was sintered at 1940° C. for 20 hours and resulted in a sintered body having a boron doping of 100 ppm, and a yttrium doping of 1500 ppm, corresponding to an equivalent $Y_2O_3$ weight percent of 0.19, and having a density of over 98% of theoretical density, an in-line transmission, for a sample thickness of 1.90 mm, of 21% at 4 microns and a resolution of 3 mrad. Trace amounts up to an equivalent 0.5 weight percent of yttrium oxide doping may be used for producing a transparent aluminum oxynitride window having an in-line transmission of at least 20% across the 0.3 to 5 micron range.

A yttrium-doped sample with a yttrium doping equivalent to a $Y_2O_3$ amount of 0.013 weight percent was sintered at 1925° C. for 24 hours. It resulted in an opaque sample, thus pointing to the need of a minimum amount of yttrium doping to achieve the improved optical qualities. By extrapolating the values of the samples available, the minimum amount of yttrium doping is believed to be equivalent to 0.02 weight percent of $Y_2O_3$.

It should be understood that the yttrium additive itself need not be present in a nearby sample nor in a vapor form. For convenience, the additive may be mixed in with the aluminum oxynitride powder prior to sintering, but otherwise it need not be placed in direct contact with the green body. Again, it is sufficient that the selected additive be available within the sintering chamber for vapor doping the aluminum oxynitride. Similarly, it should be understood that the boron is also an additive, even though it is not mixed in with the other compounds. Its presence in the sintering chamber, as part of the compounds forming the container, is sufficient to provide boron vapor doping of aluminum oxynitride. Thus, this invention is considered to encompass other methods of introducing the additives in the sintering chamber to produce in situ vapor doping of the aluminum oxynitride compact.

The sintering is found to be enhanced by the presence of specific additives, and more specifically, by the yttrium used and the boron found in the container. It is believed that the mechanism is as follows. At sintering temperatures, the mixture of aluminum oxynitride and the excess aluminum that might be present in the sample has a significantly high vapor pressure of $Al_xO_y$ gas species. The $Al_xO_y$ gas reacts with nearby boron nitride present in the container to produce $B_2O_3$ gas and/or $AlBO_2$ gas plus AlN solid. The $B_2O_3$ and/or $AlBO_2$ vapors transport to and react with aluminum oxynitride to produce a liquid phase at grain boundaries which enhances the early stages of sintering. The $B_2O_3$ also interacts with the source of yttrium doping such as the yttrium oxide vapor from an adjacent source or from the $Y_2O_3$ added to the sample to produce $YBO_2$ gas. The $YBO_2$ vapor transports to the aluminum oxynitride and dopes it with the boron and yttrium. It is believed that this additive doping aids the final stages of sintering by causing either solute drag or second phase precipitates to pin grain boundaries and thus preventing excessive grain growth which might otherwise trap pores within the grains.

It is understood that the above described embodiments of the invention are illustrative only and modifications thereof may occur to those skilled in the art. Accordingly, it is desired that this invention is not to be limited to the embodiments disclosed herein but is to be limited only as defined by the appended claims.

What is claim is:

1. A method of manufacturing a dense aluminum oxynitride body comprising the steps of:

forming a single phase aluminum oxynitride powder;

pressing said powder into a green body of predetermined shape; and sintering said green aluminum oxynitride body in a nitrogen atmosphere.

2. The method of claim 1 wherein:

said sintering step takes place in the presence of a plurality of dopants.

3. The method of claim 2 wherein:

said sintering step is carried out at a temperature and for a length of time sufficient to eliminate porosity by diffusion of said solid single phase aluminum oxynitride while preventing excessive grain growth.

4. A method of manufacturing a substantially transparent aluminum oxynitride body comprising the steps of:

forming a homogeneous single phase aluminum oxynitride powder;

pressing said powder into a green body of predetermined shape; and sintering in a nitrogen atmosphere said body in the presence of dopants.

5. The method of claim 4 wherein:

said sintering step is carried out at a temperature and for a length of time sufficient to eliminate porosity by diffusion of said solid single phase aluminum oxynitride while preventing excessive grain growth.

6. The method of claim 4 wherein:

said single phase aluminum oxynitride powder has an average particle size smaller than 1.0 microns.

7. The method of claim 4 wherein said aluminum oxynitride forming step comprises the steps of:
preparing an homogeneous mixture of aluminum nitride and aluminum oxide, said aluminum oxide forming 63 to 70 mole percent of said mixture;
calcining said mixture until substantially changed to single phase aluminum oxynitride powder; and
reducing said aluminum oxynitride powder to an average particle size less than 1.0 microns.

8. The method of claim 7 wherein:
said homogeneous mixture preparing step comprises admixing aluminum nitride and aluminum oxide powders having a purity of at least 97% and 99%, respectively, and a particle size smaller than 74 microns, and ball milling the mixture until fully mixed with an average particle size reduced to approximately 1.0 microns.

9. The method of claim 7 further comprising the step of:
adding yttrium oxide to the mixture of aluminum nitride and aluminum oxide in amounts up to 0.5 weight percent.

10. The method of claim 4 wherein:
said sintering step is at a temperature higher than 1900° C. but lower than the solidus temperature of aluminum oxynitride and for a period of time of at least 20 hours.

11. The method of claim 4 wherein:
said dopants comprise yttrium and boron or compounds thereof.

12. The method of claim 4 wherein:
said dopants are present in the sintered body in trace amounts.

13. The method of claim 11 wherein:
said dopants are in a vapor phase during a portion of said sintering step.

14. The method of claim 13 wherein:
in said sintering step, the dopant vapor transport to and diffuse throughout said body.

15. The method of claim 14 wherein:
said sintered body comprises not more than 0.5 weight percent of said dopants.

16. The method of claim 14 wherein:
said dopants produce a liquid phase at grain boundaries during said sintering step.

17. The method of manufacturing a substantially transparent aluminum oxynitride body comprising the steps of:
forming a substantially homogeneous single phase aluminum oxynitride powder having an average particle size not greater than 1.0 microns;
forming a green body of predetermined shape from said single phase powder; and
sintering said body in the presence of yttrium and boron dopants and in a nitrogen atmosphere at a temperature and for a length of time sufficient to achieve substantial densification of said aluminum oxynitride body while in its solid single phase.

18. The method of claim 17 wherein:
said dopants are present in said sintered body in trace amounts.

19. The method of claim 17 wherein:
said dopants are present in the sintered body in amounts less than 0.5 weight percent of said green body.

20. The method of claim 17 wherein:
said sintering is done at a temperature in the range from 1900° C. to the solidus temperature of aluminum oxynitride, and for a duration in the range of 20 to 100 hours.

* * * * *